(12) United States Patent
Lv

(10) Patent No.: US 11,899,217 B2
(45) Date of Patent: Feb. 13, 2024

(54) AR GLASSES DEVICE AND ELECTRONIC EQUIPMENT HAVING THE SAME

(71) Applicants: Fu Tai Hua Industry (Shenzhen) Co., Ltd., Shenzhen (CN); HON HAI PRECISION INDUSTRY CO., LTD., New Taipei (TW)

(72) Inventor: Yan Lv, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 18/137,399

(22) Filed: Apr. 20, 2023

(65) Prior Publication Data
US 2023/0251497 A1  Aug. 10, 2023

(30) Foreign Application Priority Data

Jan. 31, 2023 (CN) .......................... 202310122152.8

(51) Int. Cl.
*G02B 27/01* (2006.01)
(52) U.S. Cl.
CPC .. *G02B 27/0176* (2013.01); *G02B 2027/0159* (2013.01); *G02B 2027/0178* (2013.01)
(58) Field of Classification Search
CPC ........ G02B 27/0176; G02B 2027/0159; G02B 2027/0178
See application file for complete search history.

(56) References Cited

U.S. PATENT DOCUMENTS

| 10,809,536 | B2 * | 10/2020 | Zhang | ...................... G02C 9/00 |
| 11,415,802 | B2 * | 8/2022 | Shin | ................... G02B 27/4205 |
| 2019/0121143 | A1 * | 4/2019 | Zhang | ................ G02B 27/0176 |
| 2020/0326552 | A1 * | 10/2020 | Chung | ............... G02B 27/0176 |
| 2021/0373333 | A1 * | 12/2021 | Moon | ....................... G02C 7/08 |

(Continued)

FOREIGN PATENT DOCUMENTS

| EP | 3499300 A1 * | 6/2019 | ......... G02B 27/0172 |
| EP | 3499300 A4 * | 6/2019 | ......... G02B 27/0172 |

*Primary Examiner* — Michael Pervan
(74) *Attorney, Agent, or Firm* — ScienBiziP, P.C.

(57) ABSTRACT

An AR glasses device includes a supporting portion, an optical-mechanical assembly, and an adjustment assembly comprising a first adjustment module and a second adjustment module. The optical-mechanical assembly comprises a first optical-mechanical module and a second optical-mechanical module arranged in a second direction. The first optical-mechanical module comprises a first waveguide sheet and a first fixing portion to drive the first waveguide sheet to rotate about the second direction. The second optical-mechanical module comprises a second fixing portion and a second waveguide sheet. The first adjustment module extends through the supporting portion in a first direction and connects the first fixing portion. An arc-shaped groove about the first direction penetrates the supporting portion in the first direction. The second adjustment module slides in the arc-shaped groove, and the second adjustment module is configured to drive the second waveguide sheet to rotate about the first direction through the second fixing portion.

20 Claims, 4 Drawing Sheets

(56) References Cited

U.S. PATENT DOCUMENTS

| | | | |
|---|---|---|---|
| 2023/0090308 A1* | 3/2023 | Borisov | G02B 27/0037 385/37 |
| 2023/0120469 A1* | 4/2023 | Tang | G02B 27/0176 345/633 |

* cited by examiner

AR GLASSES DEVICE AND ELECTRONIC EQUIPMENT HAVING THE SAME

FIELD

The subject matter herein generally relates to a technical field of smart electronic devices, in particular to an AR glasses device and an electronic equipment having the AR glasses device.

BACKGROUND

Augmented Reality (AR) glasses device includes a frame and two groups of optical-mechanical modules. Each of the optical-mechanical modules includes a lens with specific optical properties, such as an optical waveguide sheet. Each of the optical-mechanical modules further includes an image processing unit for providing an image source. The image source is reflected into the left and right eyes through two groups of lenses to achieve binocular image fusion. When using the AR glasses device, if the AR glasses device is impacted by external forces (such as falling), the lens of at least one group of the optical-mechanical modules may be shifted, so that the virtual images reflected by the lenses to the left and the right eyes cannot overlap, which may affect users' experience.

BRIEF DESCRIPTION OF THE DRAWINGS

Implementations of the present disclosure will now be described, by way of embodiments, with reference to the attached figures.

DETAILED DESCRIPTION

Figure 1:
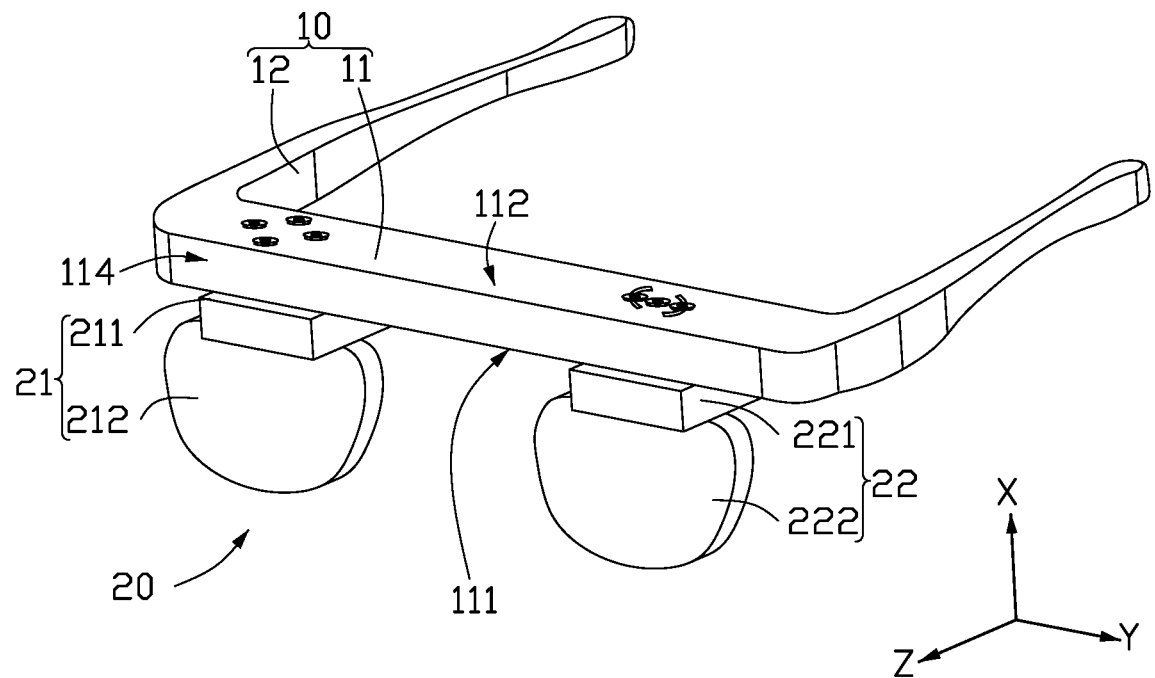
FIG. 1 is a diagram of an embodiment of an AR glasses device according to the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to better illustrate details and features of the present disclosure.

The disclosure is illustrated by way of example and not by way of limitation in the figures of the accompanying drawings, in which like references indicate similar elements. It should be noted that references to "an" or "one" embodiment in this disclosure are not necessarily to the same embodiment, and such references mean "at least one."

The term "comprising," when utilized, means "including, but not necessarily limited to"; it specifically indicates open-ended inclusion or membership in the so-described combination, group, series, and the like.

Figure 2:
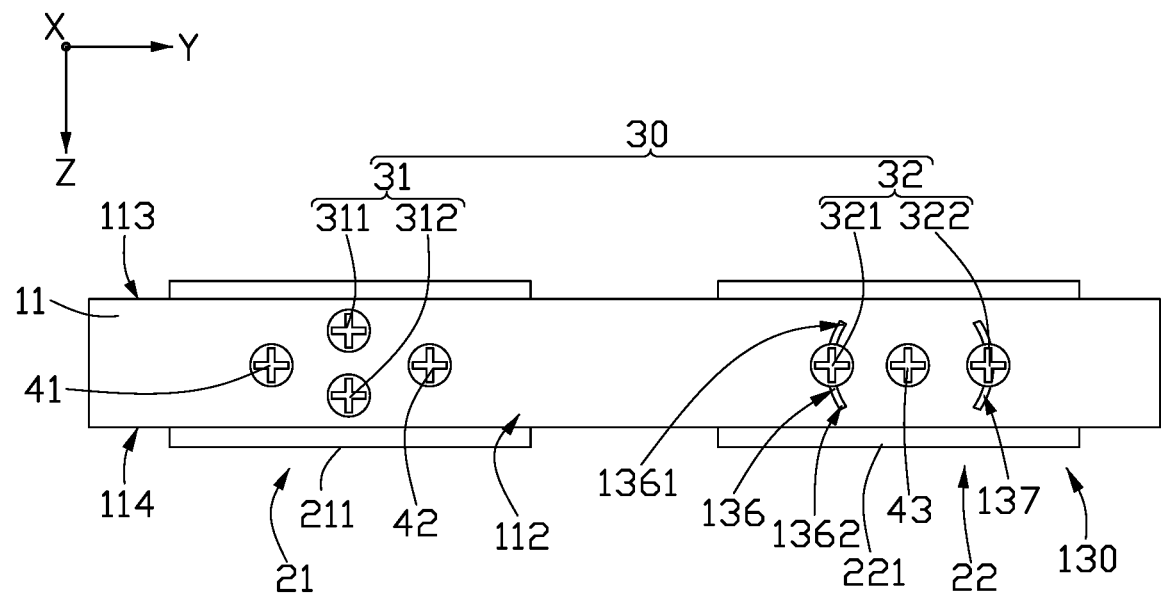
FIG. 2 is a top view of the AR glasses device of FIG. 1.

FIG. 1 illustrates an embodiment of an AR glasses device 100. Referring to FIGS. 1 and 2, the AR glasses device 100 includes a frame 10, an optical-mechanical assembly 20, and an adjustment assembly 30. The frame 10 includes a supporting portion 11 and two legs 12 connected to the frame 10. The legs 12 are configured to hang on the ears to realize wearing of the AR glasses device 100. The supporting portion 11 includes a first surface 111, a second surface 112, a third surface 113 and a fourth surface 114. The second surface 112 faces away from the first surface 111. The third surface 113 and the fourth surface 114 are respectively connected between the second surface 112 and the first surface 111, the third surface 113 faces away from the fourth surface 114. In normal use, the first surface 111 is a lower surface of the supporting portion 11, the second surface 112 is an upper surface of the supporting portion 11, the third surface 113 faces the user, and the fourth surface 114 faces away from the user. A thickness direction of the supporting portion 11 (that is, a direction from the first surface 111 to the second surface 112) is defined as a first direction X, a length direction of the supporting portion 11 is defined as a second direction Y, a width direction of the supporting portion 11 (that is, a direction from the third surface 113 to the fourth surface 114) is defined as a third direction Z. The second direction Y may be perpendicular to the first direction X and the third direction Z respectively.

Figure 3:
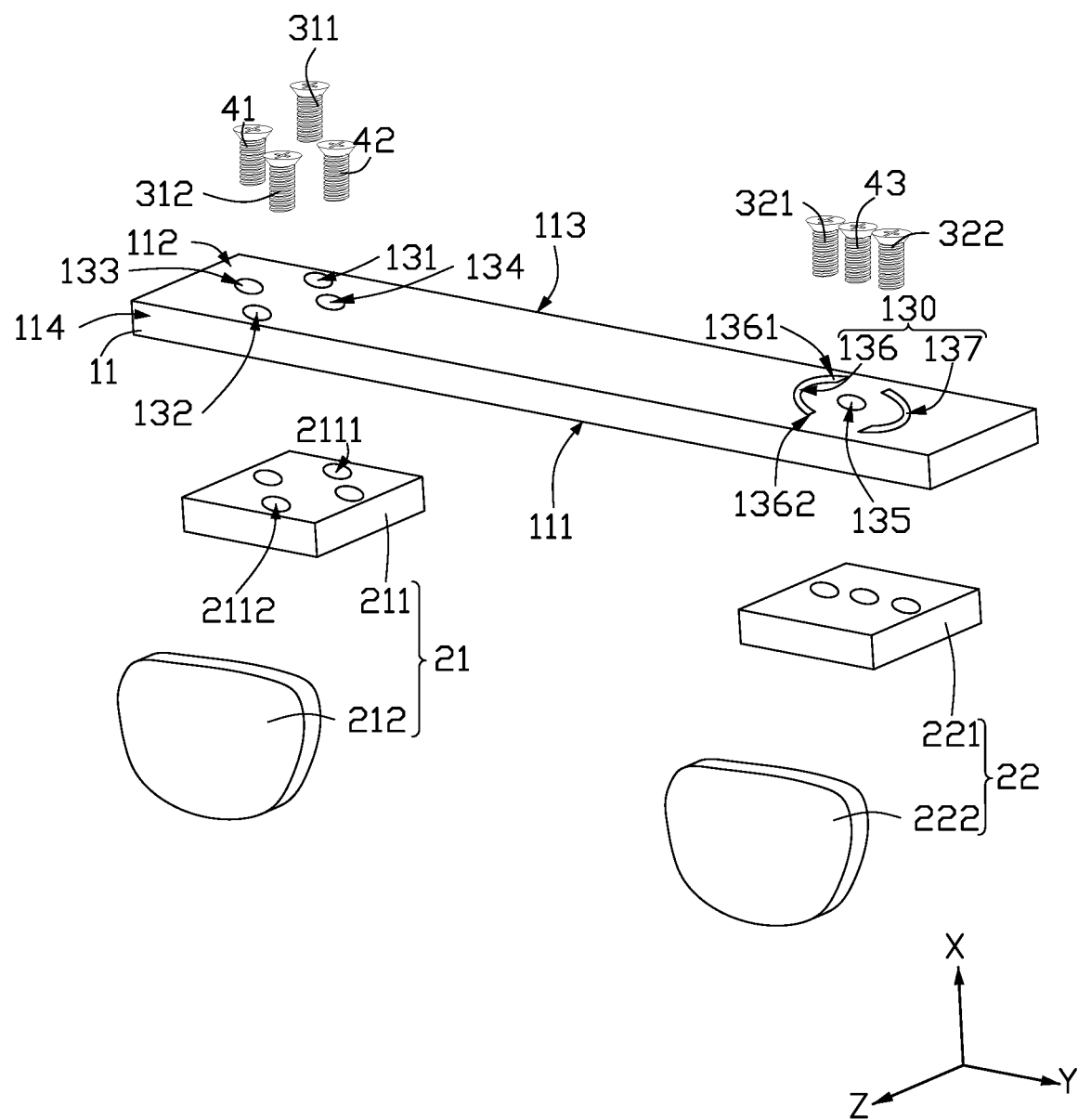
FIG. 3 is an exploded, diagrammatic view of the AR glasses device of FIG. 1.

Referring to FIGS. 1, 2, and 3, the optical-mechanical assembly 20 is arranged on the first surface 111. The optical-mechanical assembly 20 includes a first optical-mechanical module 21 and a second optical-mechanical module 22. The first optical-mechanical module 21 and the second optical-mechanical module 22 are arranged at intervals along the second direction Y. The adjustment assembly 30 includes a first adjustment module 31 and a second adjustment module 32. The first optical-mechanical module 21 includes a first fixing portion 211 and a first waveguide sheet 212, the first waveguide sheet 212 is fixed on the first fixing portion 211. The first fixing portion 211 is fixed on the supporting portion 11 through the first adjustment module 31, the first fixing portion 211 is also used to drive the first waveguide sheet 212 to rotate about the second direction Y. One end of the first adjustment module 31 abuts against the second surface 112, and the other end of the first adjustment module 31 extends through the supporting portion 11 and is locked to the first fixing portion 211.

The second optical-mechanical module 22 includes a second fixing portion 221 and a second waveguide sheet 222. The second waveguide sheet 222 is fixed on the second fixing portion 221, and the second fixing portion 221 is installed on the supporting portion 11 through the second adjustment module 32. The second adjustment module 32 extends through the supporting portion 11. One end of the second adjustment module 32 abuts against the second surface 112, the other end of the second adjustment module 32 is located on a side of the first surface 111 facing away from the second surface 112 and the other end of the second adjustment module 32 is locked to the second fixing portion 221.

An arc-shaped groove 130 is formed in the supporting portion 11, and the arc-shaped groove 130 is arranged about the first direction X. The arc-shaped groove 130 penetrates the first surface 111 and the second surface 112. The second adjustment module 32 extends through the arc-shaped groove 130, and the second adjustment module 32 is slidably located in the arc-shaped groove 130 along a direction about the first direction X. The second adjustment module 32 is used to drive the second waveguide sheet 222 to rotate about the first direction X through the second fixing portion 221.

During use, when the AR glassed device 100 is affected by an external force, and either or both of the first waveguide sheet 212 and the second waveguide sheet 222 are slightly shifted about the second direction Y, the user can loosen the first adjustment module 31, and then using the second waveguide sheet 222 as a reference, manually rotate the first waveguide sheet 212 about the second direction Y through the first fixing portion 211, and then fix the rotated first waveguide sheet 212 through the first adjustment module 31, so that the first waveguide sheet 212 is adjusted close to or far away from the human eye, and the virtual images reflected by the first waveguide sheet 212 and the second waveguide sheet 222 to the left and right eyes overlap.

As another example, when the AR glassed device 100 is affected by an external force, and either or both of the first waveguide sheet 212 and the second waveguide sheet 222 are slightly shifted about the second direction Y, the user can loosen the second adjustment module 32, and then using the first waveguide sheet 212 as a reference, manually adjust second adjustment module 32 in the arc-shaped groove 130 along the direction about the first direction X to manually rotate the second waveguide sheet 222 about the first direction X through the second fixing portion 222, and then fix the rotated second waveguide sheet 222 through the second adjustment module 32, so that the virtual images reflected by the first waveguide sheet 212 and the second waveguide sheet 222 to the left and right eyes overlap.

After at least one of the first waveguide sheet 212 and the second waveguide sheet 222 of the optical-mechanical assembly 20 are shifted at any angle, by adjusting at least one of the first adjustment module 31 and the second adjustment module 32, the deviation correction of the optical-mechanical assembly 20 can be realized, and the structure of the AR glassed device 100 is simple and the AR glassed device 100 is easy to operate.

In at least one embodiment, the first fixing portion 211 and the second fixing portion 221 may be further provided with electronic components (not shown), such as image sources, LEDs and other components. The first fixing portion 211 and the second fixing portion 221 may both be shell or bracket structures.

Referring to FIGS. 2 and 3, in at least one embodiment, the first adjustment module 31 may include a first adjusting pillar 311 and a second adjusting pillar 312. A first through hole 131 and a second through hole 132 are formed in the supporting portion 11, and the first through hole 131 and the second through hole 132 penetrate the first surface 111 and the second surface 112, respectively. A first mounting hole 2111 and a second mounting hole 2112 are formed in the first fixing portion 211. The first through hole 131 is closer to the third surface 113 than the second through hole 132. The first adjusting pillar 311 cooperates with the first through hole 131 and the first mounting hole 2111 and the second adjusting pillar 312 cooperates with the second through hole 132 and the second mounting hole 2112 to fix the first fixing portion 211 to the supporting portion 11. A length of a portion of the first adjusting pillar 311 embedded in the first mounting hole 2111 is less than or greater than a length of a portion of the second adjusting pillar 312 embedded in the second mounting hole 2112, thereby forming an angle between the first surface 111 and a top surface of the first fixing portion 211 facing the first surface 111.

When the first optical-mechanical module 21 deviates in a direction around the second direction Y relative to the human eye, the user needs to loosen the first adjusting pillar 311 and the second adjusting pillar 312 respectively, then using the second waveguide sheet 222 as a reference, manually rotate the first fixing portion 211 to drive the first waveguide sheet 212 to rotate about the second direction Y until images reflected by the first waveguide sheet 212 and the second waveguide sheet 222 to the human eyes achieves binocular fusion. Afterwards, in this state, the first waveguide sheet 212 are locked by the first adjusting pillar 311 and the second adjusting pillar 312, so as to realize the fine adjustment of the AR glasses device 100. The supporting portion 11 and one end of the first fixing portion 211 are completely attached through any one of the first adjusting pillar 311 and the second adjusting pillar 312, and the supporting portion 11 and the other end of the first fixing portion 211 are spaced apart from each other, so that the angle is formed between the first surface 111 and the first fixing portion 211. In at least one embodiment, by adjusting the angle between the first surface 111 and the first fixing portion 211, the position of the first optical-mechanical module 21 relative to the human eye is adjusted, so that the virtual images reflected by the first waveguide sheet 212 and the second waveguide sheet 222 to the left and right eyes can overlap, and the user experience can be improved.

In at least one embodiment, each of the first adjusting pillar 311 and the second adjusting pillar 312 may be a screw. So that the structures of the first adjusting pillar 311 and the second adjusting pillar 312 are simple, and the first adjusting pillar 311 and the second adjusting pillar 312 can be adjusted easily.

Referring to FIGS. 2 and 3, in at least one embodiment, the first through hole 131 and the second through hole 132 are spaced apart along the third direction Z, so that when any one of the first adjusting pillar 311 and the second adjusting pillar 312 is adjusted, the angle between the first surface 111 and the first fixing portion 211 can be adjusted quickly and stably. In at least one embodiment, as a distance between the first through hole 131 and the second through hole 132 increases, the adjustment range of the first adjusting pillar 311 relative to the second adjusting pillar 312 or the adjustment range of the second adjusting pillar 312 relative to the first adjusting pillar 311 becomes smaller.

Referring to FIGS. 2 and 3, in at least one embodiment, the AR glasses device 100 may further include a first fastener 41 and a second fastener 42, the supporting portion 11 may further include a third through hole 133 and a fourth through hole 134. The first fastener 41 extends through the third through hole 133 and is locked to the first fixing portion 211, the second fastener 42 extends through fourth through hole 134 and is locked to the first fixing portion 211, so that the first fixing portion 211 is locked to the supporting portion 11. The third through hole 133 and the fourth through hole 134 may be spaced apart along the second direction Y. In at least one embodiment, a line connecting a center of the third through hole 133 and a center of the fourth through hole 134 is perpendicular to a line connecting a center of the first through hole 131 and a center of the second through hole 132, so that the first fixing portion 211 is more firmly locked to the supporting portion 11 along the second direction Y, and the first optical-mechanical module 21 is prevented from shifting in the second direction Y.

In at least one embodiment, each of the first fastener 41 and the second fastener 42 may be a screw. In at least one embodiment, each of the first fastener 41 and the second fastener 42 may be a magnetic pillar, and the supporting portion 11 may be magnetically connected with the first fixing portion 211 through the magnetic pillar.

In at least one embodiment, the center of the first through hole 131, the center of the third through hole 133, the center of the second through hole 132, and the center of the fourth through hole 134 may be sequentially connected to form a prism, which may further improve the stability of the first optical-mechanical module 21 installed on the supporting portion 11.

Referring to FIGS. 2 and 3, in at least one embodiment, the AR glasses device 100 may further include a third fastener 43, and the supporting portion 11 may further include a fifth through hole 135. The third fastener 43 extends through the fifth through hole 135 and the second optical-mechanical module 22 is locked to the supporting portion 11 through the third fastener 43. In at least one embodiment, the third fastener 43 may be a screw.

Referring to FIGS. 2 and 3, in at least one embodiment, the arc-shaped groove 130 may include a first arc-shaped portion 136 penetrating the supporting portion 11, and the center of a circle corresponding to the first arc-shaped portion 136 may coincide with the center of the fifth through hole 135. The second adjustment module 32 may include a third adjusting pillar 321, one end of the third adjusting pillar 321 abuts against the second surface 112, and the other end of the third adjusting pillar 321 is located on a side of the first surface 111 facing away from the second surface 112 and the other end of the third adjusting pillar 321 is connected to the second fixing portion 221, so that the second fixing portion 221 is locked to the supporting portion 11. The first arc-shaped portion 136 includes a first end 1361 and a second end 1362 in an extending direction an arc of the first arc-shaped portion 136. A line connecting the first end 1361 and the second end 1362 may be arranged along the third direction Z.

When the second optical-mechanical module 22 deviates in a direction around the first direction X relative to the human eye, the user loosens the third fastener 43 and the third adjusting pillar 321, then using the first waveguide sheet 212 as a reference, manually rotate the second fixing portion 221 to drive the second waveguide sheet 222 to rotate about the first direction X, the third adjusting pillar 321 slides in the first arc-shaped portion 136 until the images reflected by the first waveguide sheet 212 and the second waveguide sheet 222 to the human eyes achieves binocular fusion. Afterwards, in this state, the third adjusting pillar 321 is tightened to fix the second fixing portion 221 at a preset position, and the third fastener 43 is tightened to firmly lock the second fixing portion 221 to the supporting portion 11, so as to realize fine adjustment of the AR glasses device 100 in the first direction X.

In addition, if both the first waveguide sheet 212 and the second waveguide sheet 222 are offset, the deviation of the first waveguide sheet 212 may be corrected by the above-mentioned manner, that is, the first waveguide sheet 212 rotates in the direction around the second direction Y, and then the deviation of the second waveguide sheet 222 may be corrected, that is, the second waveguide sheet 222 rotates in the direction around the first direction X. Or, the above two deviation corrections may be alternately performed several times in sequence until the images reflected by the first waveguide sheet 212 and the second waveguide sheet 222 to the human eyes achieves binocular fusion.

At the same time, the adjustment assembly 30 may also be adapted to adjust different interpupillary distances of the AR glasses device 100 to meet the needs of different users. For example, when the same AR glasses devices 100 are worn by different users, sur to the difference in the interpupillary distances, the virtual images formed in the eyes of some users may not be superimposed. At this time, the above problem can be overcome by adjusting the adjustment assembly 30, the adjustment assembly 30 has a simple structure and is easy to operate.

In at least one embodiment, the second adjustment module 32 may further include a fourth adjusting pillar 322, and the arc-shaped groove 130 may further include a second arc-shaped portion 137. The fourth adjusting pillar 322 extends through the second arc-shaped portion 137 and can slide in the second arc-shaped portion 137 along an extending direction of an arc of the second arc-shaped portion 137. The first arc-shaped portion 136 and the second arc-shaped portion 137 may be concentrically arranged. One end of the fourth adjusting pillar 322 is connected to the second optical-mechanical module 22, so that the second optical-mechanical module 22 is locked to the supporting portion 11. When it is necessary to adjust the rotation of the second optical-mechanical module 22 relative to the supporting portion 11, the fourth adjusting pillar 322 and the third adjusting pillar 321 slide in the second arc-shaped portion 137 and the first arc-shaped portion 136 respectively at the same time, thereby improving the rotation stability of the second optical-mechanical module 22 and the stability of the second optical-mechanical module 22 being locked to the supporting portion 11.

In at least one embodiment, in the second direction Y, the first arc-shaped portion 136 and the second arc-shaped portion 137 may be arranged symmetrically with respect to the fifth through hole 135, so as to further improve the balance and stability of the rotation of the second optical-mechanical module 22 relative to the supporting portion 11.

In at least one embodiment, each of the third adjusting pillar 321 and the fourth adjusting pillar 322 may be a screw.

In the present disclosure, when the AR glasses device 100 is affected by an external force during use, either or both of the first optical-mechanical module 21 deviates in the direction around the second direction Y and the second optical-mechanical module 22 deviates in the direction around the first direction X. If there is a deviation in the direction around the second direction Y, using the second waveguide sheet 222 as a reference, the first fixing portion 211 is adjusted to drive the first waveguide sheet 212 to rotate about the second direction Y until images reflected by the first waveguide sheet 212 and the second waveguide sheet 222 to the human eyes achieves binocular fusion, so as to realize the fine adjustment of the AR glasses device 100. If there is a deviation in the direction around the first direction X, using the first waveguide sheet 212 as a reference, the second fixing portion 221 is adjusted to drive the second waveguide sheet 222 to rotate about the first direction X and the second adjustment module 32 slides in the arc-shaped groove 130 until the images reflected by the first waveguide sheet 212 and the second waveguide sheet 222 to the human eyes achieves binocular fusion, so as to realize fine adjustment of the AR glasses device 100 in the first direction X. If both the deviation in the direction around the first direction X and the deviation in the direction around the second direction Y occurs, the rotation of the first waveguide sheet 212 about the second direction Y and the rotation of the second waveguide sheet 222 about the first direction X can be adjusted simultaneously or successively, so as to realize fine adjustments of the AR glasses device 100 in the first direction X and in the second direction Y. The AR glasses device 100 has a simple structure and is easy to operate.

Figure 4:
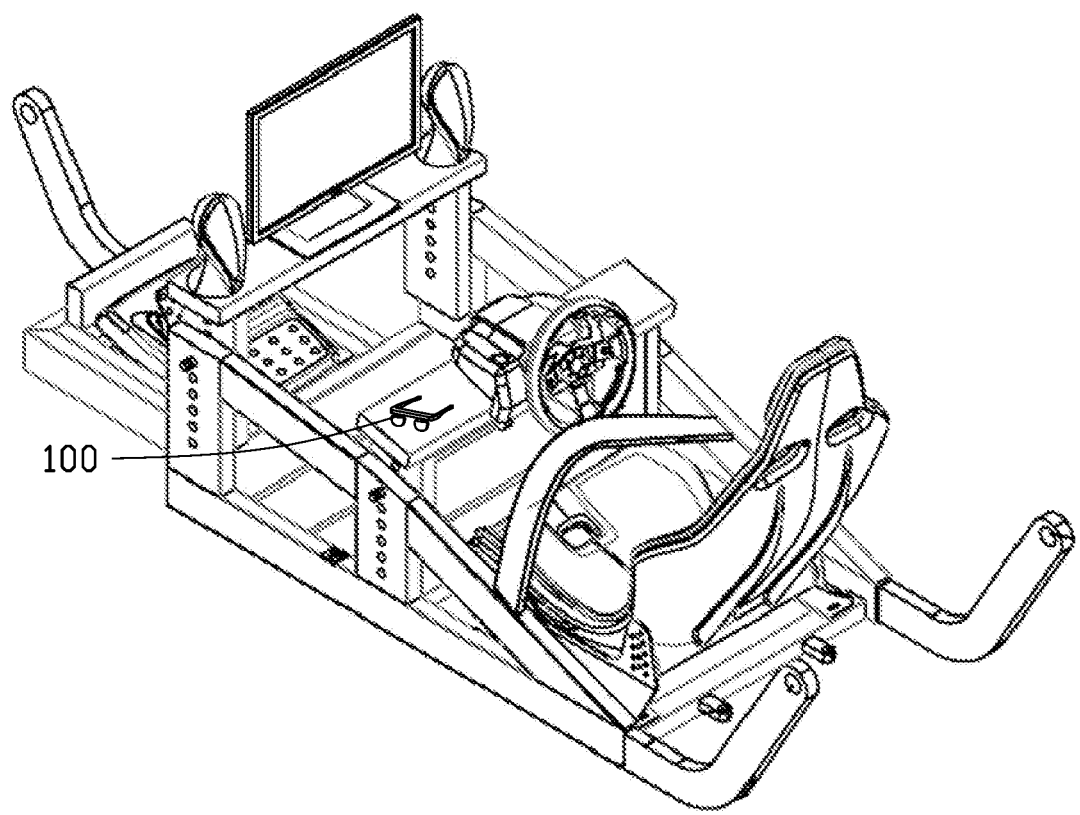
FIG. 4 is a diagram of an embodiment of an electronic equipment according to the present disclosure.

FIG. 4 illustrates an embodiment of an electronic equipment 200. The above-mentioned AR glassed device 100 can be applied in the electronic equipment 200, such as a simulated driving equipment or a game equipment.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. An augmented reality glasses device comprising:
   a supporting portion comprising a first surface and a second surface facing away from the first surface, the first surface and the second surface being spaced apart in a first direction;
   an optical-mechanical assembly arranged on the first surface; and
   an adjustment assembly comprising a first adjustment module and a second adjustment module;
   wherein the optical-mechanical assembly comprises a first optical-mechanical module and a second optical-mechanical module arranged at intervals in a second direction, the first optical-mechanical module comprises a first fixing portion and a first waveguide sheet fixed on the first fixing portion, the first fixing portion is configured to drive the first waveguide sheet to rotate about the second direction, the second optical-mechanical module comprises a second fixing portion and a second waveguide sheet fixed on the second fixing portion; the first adjustment module extends through the supporting portion, one end of the first adjustment module abuts against the second surface, and the other end of the first adjustment module is locked to the first fixing portion; an arc-shaped groove penetrates the first surface and the second surface; the arc-shaped groove is arranged about the first direction, the second adjustment module extends through the arc-shaped groove and slides in the arc-shaped groove, one end of the second adjustment module abuts against the second surface, and the other end of the second adjustment module is locked to the second fixing portion, the second adjustment module is configured to drive the second waveguide sheet to rotate about the first direction through the second fixing portion.

2. The augmented reality glasses device of claim 1, wherein the first adjustment module comprises a first adjusting pillar and a second adjusting pillar, the supporting portion comprises a first through hole and a second through hole, a first mounting hole and a second mounting hole are formed in the first fixing portion; the first adjusting pillar cooperates with the first through hole and the first mounting hole, and the second adjusting pillar cooperates with the second through hole and the second mounting hole to fix the first fixing portion to the supporting portion, a length of a portion of the first adjusting pillar embedded in the first mounting hole is less than or greater than a length of a portion of the second adjusting pillar embedded in the second mounting hole.

3. The augmented reality glasses device of claim 2, wherein the supporting portion further comprises a third surface and a fourth surface facing away from the third surface, the third surface and the fourth surface are spaced apart in a third direction, the third direction is perpendicular to the first direction, the first through hole is closer to the third surface than the second through hole.

4. The augmented reality glasses device of claim 3, wherein the augmented reality glasses device further comprises a first fastener and a second fastener, the supporting portion further comprises a third through hole and a fourth through hole, a connecting line between a center of the third through hole and a center of the fourth through hole is perpendicular to a connecting line between a center of the first through hole and a center of the second through hole, the first fastener extends through the third through hole, the second fastener extends through the fourth through hole, and the first fixing portion is fixed on the supporting portion by the first fastener and the second fastener.

5. The augmented reality glasses device of claim 2, wherein both the first adjusting pillar and the second adjusting pillar are screws.

6. The augmented reality glasses device of claim 1, wherein the augmented reality glasses device further comprises a third fastener, the supporting portion further comprises a fifth through hole, the third fastener extends through the fifth through hole, and the second fixing portion is fixed on the supporting portion by the third fastener.

7. The augmented reality glasses device of claim 6, wherein the arc-shaped groove comprises a first arc-shaped portion penetrating the supporting portion, a center of an imaginary circle defining the first arc-shaped portion coincides with a center of the fifth through hole, the second adjustment module comprises a third adjusting pillar extending through the first arc-shaped portion, the third adjusting pillar is slidably arranged in the first arc-shaped portion, and the second fixing portion is locked to the supporting portion through the third adjusting pillar, the first arc-shaped portion comprises a first end and a second end in an extending direction an arc of the first arc-shaped portion, the first end and the second end are arranged a direction perpendicular to the second direction.

8. The augmented reality glasses device of claim 7, wherein the third adjusting pillar is a screw.

9. The augmented reality glasses device of claim 7, wherein the second adjustment module further comprises a fourth adjusting pillar, the arc-shaped groove further comprises a second arc-shaped portion penetrating the supporting portion, the fourth adjusting pillar extends through the second arc-shaped portion and is slidably arranged in the second arc-shaped portion, the first arc-shaped portion and the second arc-shaped portion are concentrically arranged, the fixing portion is locked to the supporting portion through the fourth adjusting pillar.

10. The augmented reality glasses device of claim 9, wherein in the second direction, the first arc-shaped portion and the second arc-shaped portion are arranged symmetrically.

11. An electronic equipment comprising:
    an augmented reality glasses device comprising:
      a supporting portion comprising a first surface and a second surface facing away from the first surface, the first surface and the second surface being spaced apart in a first direction;
      an optical-mechanical assembly arranged on the first surface; and
      an adjustment assembly comprising a first adjustment module and a second adjustment module;
      wherein the optical-mechanical assembly comprises a first optical-mechanical module and a second optical-mechanical module arranged at intervals in a second direction, the first optical-mechanical module comprises a first fixing portion and a first waveguide sheet fixed on the first fixing portion, the first fixing portion is configured to drive the first waveguide sheet to rotate about the second direction, the second optical-mechanical module comprises a second fixing portion and a second waveguide sheet fixed on the second fixing portion; the first adjustment module extends through the supporting portion, one end of the first adjustment module abuts against the second surface, and the other end of the first adjustment module is locked to the first fixing portion; an arc-shaped groove penetrates the first surface and the second surface; the arc-shaped groove is arranged about the first direction, the second adjustment module extends through the arc-shaped groove and slides in the arc-shaped groove, one end of the second adjustment module abuts against the second surface, and the other end of the second adjustment module is locked to the second fixing portion, the second adjustment module is configured to drive the second waveguide sheet to rotate about the first direction through the second fixing portion.

12. The electronic equipment of claim 11, wherein the first adjustment module comprises a first adjusting pillar and a second adjusting pillar, the supporting portion comprises a first through hole and a second through hole, a first mounting hole and a second mounting hole are formed in the first fixing portion; the first adjusting pillar cooperates with the first through hole and the first mounting hole, and the second adjusting pillar cooperates with the second through hole and the second mounting hole to fix the first fixing portion to the supporting portion, a length of a portion of the first adjusting pillar embedded in the first mounting hole is less than or greater than a length of a portion of the second adjusting pillar embedded in the second mounting hole.

13. The electronic equipment of claim 12, wherein the supporting portion further comprises a third surface and a fourth surface facing away from the third surface, the third surface and the fourth surface are spaced from apart in a third direction, the third direction is perpendicular to the first direction, the first through hole is closer to the third surface than the second through hole.

14. The electronic equipment of claim 13, wherein the augmented reality glasses device further comprises a first fastener and a second fastener, the supporting portion further comprises a third through hole and a fourth through hole, a connecting line between a center of the third through hole and a center of the fourth through hole is perpendicular to a connecting line between a center of the first through hole and a center of the second through hole, the first fastener extends through the third through hole, the second fastener extends through the fourth through hole, and the first fixing portion is fixed on the supporting portion by the first fastener and the second fastener.

15. The electronic equipment of claim 12, wherein both the first adjusting pillar and the second adjusting pillar are screws.

16. The electronic equipment of claim 11, wherein the augmented reality glasses device further comprises a third fastener, the supporting portion further comprises a fifth through hole, the third fastener extends through the fifth through hole, and the second fixing portion is fixed on the supporting portion by the third fastener.

17. The electronic equipment of claim 16, wherein the arc-shaped groove comprises a first arc-shaped portion penetrating the supporting portion, a center of an imaginary circle defining the first arc-shaped portion coincides with a center of the fifth through hole, the second adjustment module comprises a third adjusting pillar extending through the first arc-shaped portion, the third adjusting pillar is slidably arranged in the first arc-shaped portion, and the second fixing portion is locked to the supporting portion through the third adjusting pillar, the first arc-shaped portion comprises a first end and a second end in an extending direction an arc of the first arc-shaped portion, the first end and the second end are arranged a direction perpendicular to the second direction.

18. The electronic equipment of claim 17, wherein the third adjusting pillar is a screw.

19. The electronic equipment of claim 17, wherein the second adjustment module further comprises a fourth adjusting pillar, the arc-shaped groove further comprises a second arc-shaped portion penetrating the supporting portion, the fourth adjusting pillar extends through the second arc-shaped portion and is slidably arranged in the second arc-shaped portion, the first arc-shaped portion and the second arc-shaped portion are concentrically arranged, the fixing portion is locked to the supporting portion through the fourth adjusting pillar.

20. The electronic equipment of claim 19, wherein in the second direction, the first arc-shaped portion and the second arc-shaped portion are arranged symmetrically.

* * * * *